G. A. W. RUSHWORTH.
ROTARY DUPLICATING MACHINE.
APPLICATION FILED JAN. 3, 1921.

1,407,087.

Patented Feb. 21, 1922.
6 SHEETS—SHEET 2.

INVENTOR.
Geo. A. W. Rushworth
by I. Owden O'Brien
atty

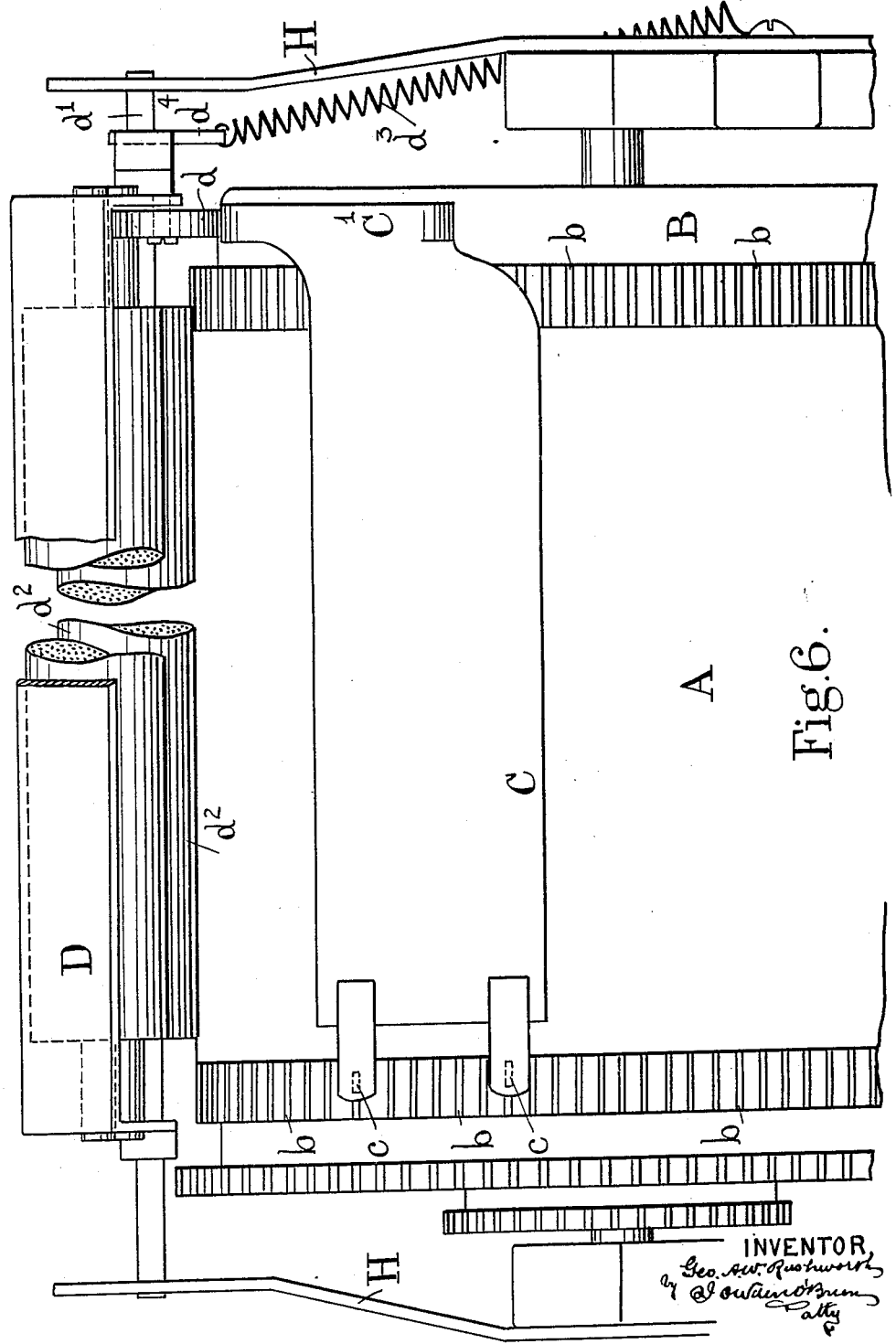

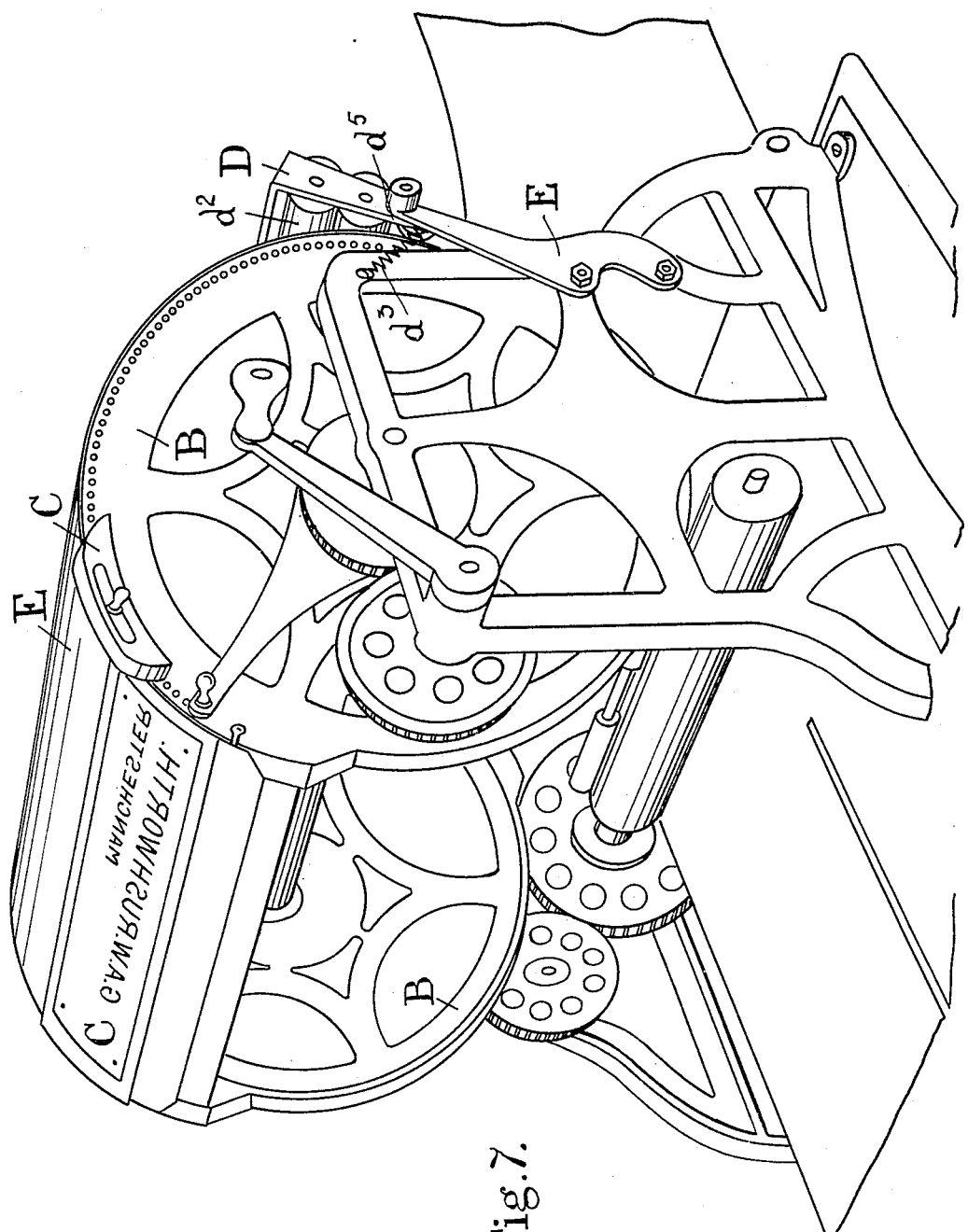

G. A. W. RUSHWORTH.
ROTARY DUPLICATING MACHINE.
APPLICATION FILED JAN. 3, 1921.

1,407,087.

Patented Feb. 21, 1922.
6 SHEETS—SHEET 6.

INVENTOR
Geo. A. W. Rushworth
J. Owden O'Brien
atty

UNITED STATES PATENT OFFICE.

GEORGE ARTHUR WILLIAM RUSHWORTH, OF MANCHESTER, ENGLAND.

ROTARY DUPLICATING MACHINE.

1,407,087.    Specification of Letters Patent.    Patented Feb. 21, 1922.

Application filed January 3, 1921. Serial No. 434,527.

*To all whom it may concern:*

Be it known that I, GEORGE ARTHUR WILLIAM RUSHWORTH, a British subject, residing at Withington, city of Manchester, county of Lancaster, England, have invented certain new and useful Improvements in Rotary Duplicating Machines, of which the following is a specification.

This invention relates to improvements in rotary duplicating machines.

It consists essentially in providing means in such machines whereby in addition to the matter printed by the machine (whether directly from type by type through a ribbon or by a wax or other stencil) other matter can be printed at the same operation, either from a block, metal, rubber, or other type or an electro-type separately inked.

This invention will be fully described with reference to the accompanying drawings.

Fig. 6 is a part back elevation of the arrangement shown in Figs. 1, 3, and 5.

Fig. 7 is a perspective view showing the invention applied to a rotary duplicating machine in which the printing is effected by a stencil.

Figs. 1 to 6 show the invention applied to a rotary duplicating machine in which the printing is effected through a ribbon A by type set up on a rotary cylinder B (or upon a segmental drum on flexible form carried by a rotary cylinder). The additional matter to be printed is formed on an electro-type plate C fitted with projections $c$ to engage in the type slots $b$ of the cylinder B (or segmental drum or form). One side or edge of the additional printing plate C is fitted with an inclined or cam surface C' which engages a runner $d$ controlling an inking device D. The inking device is pivotally mounted on a bar $d'$ carried on supports E, affixed to the frame of the machine so that the engagement of the cam surface C' with the runner $d$ causes the inking device to be depressed and the rollers $d^2$ thereof to engage the printing surface of the additional printing plate C to apply the ink to the printing surface of the latter, at each revolution thereof. A spring $d^3$ affixed to a projection $d^4$ on the inking device D and to the frame of the machine returns the inking device to its normal position when the cam surface has moved out of engagement with the runner $d$.

Figure 1:
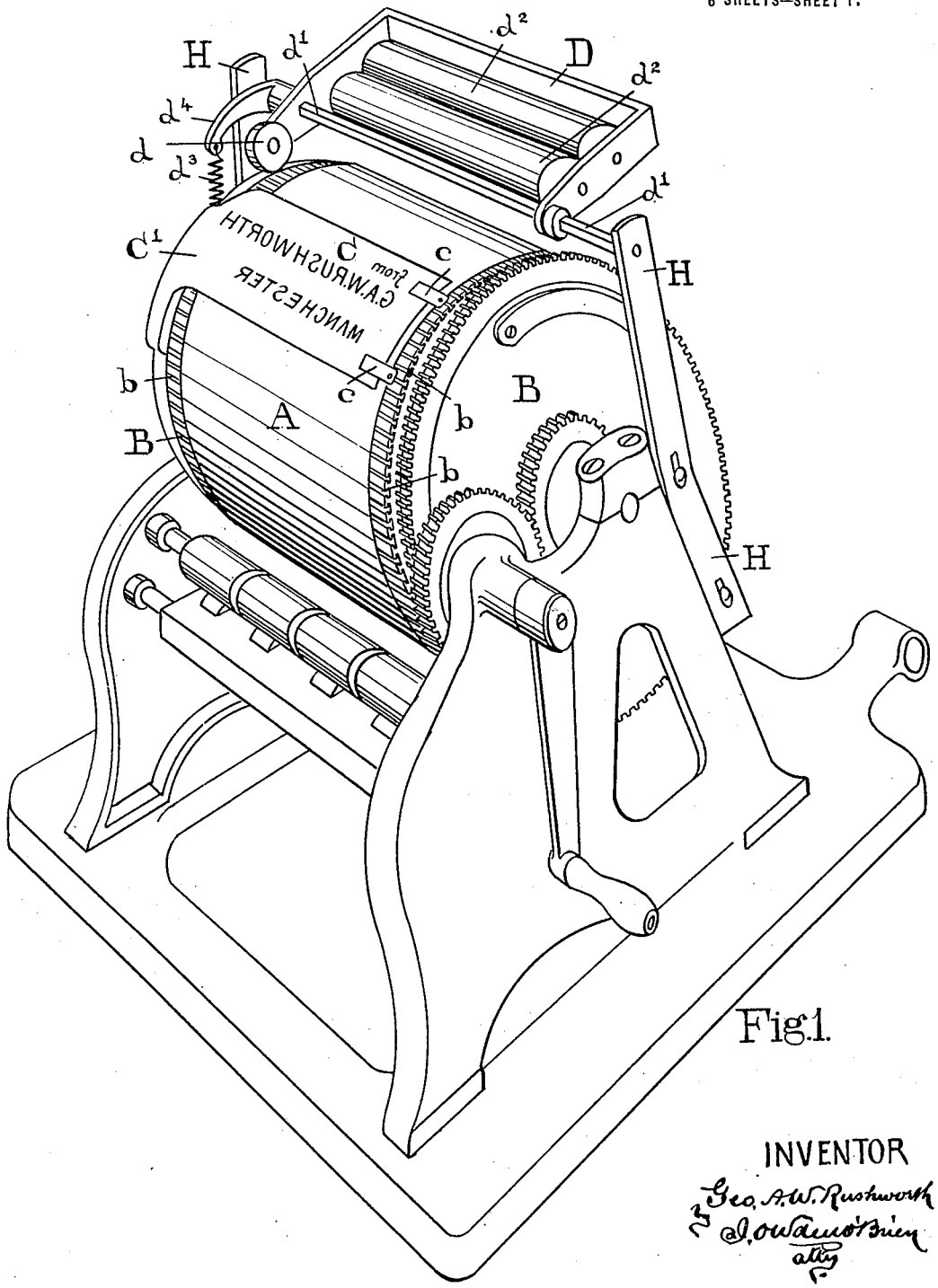
Fig. 1 is a perspective view showing the invention applied to a rotary duplicating machine in which the printing is done through a ribbon by type set up on a cylinder.
Figure 2:
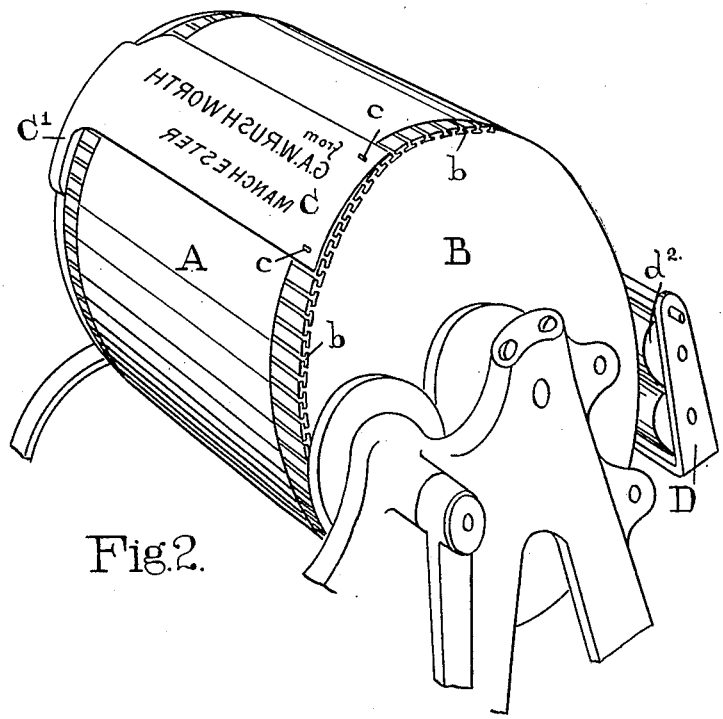
Fig. 2 is a perspective view showing a modified form of the invention applied to same type of machine.
Figure 4:
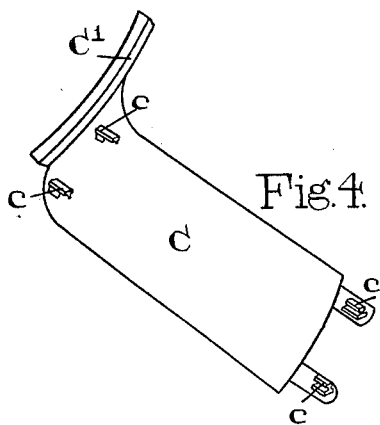
Fig. 4 is a perspective view of the auxiliary printing plate.
Figure 3:
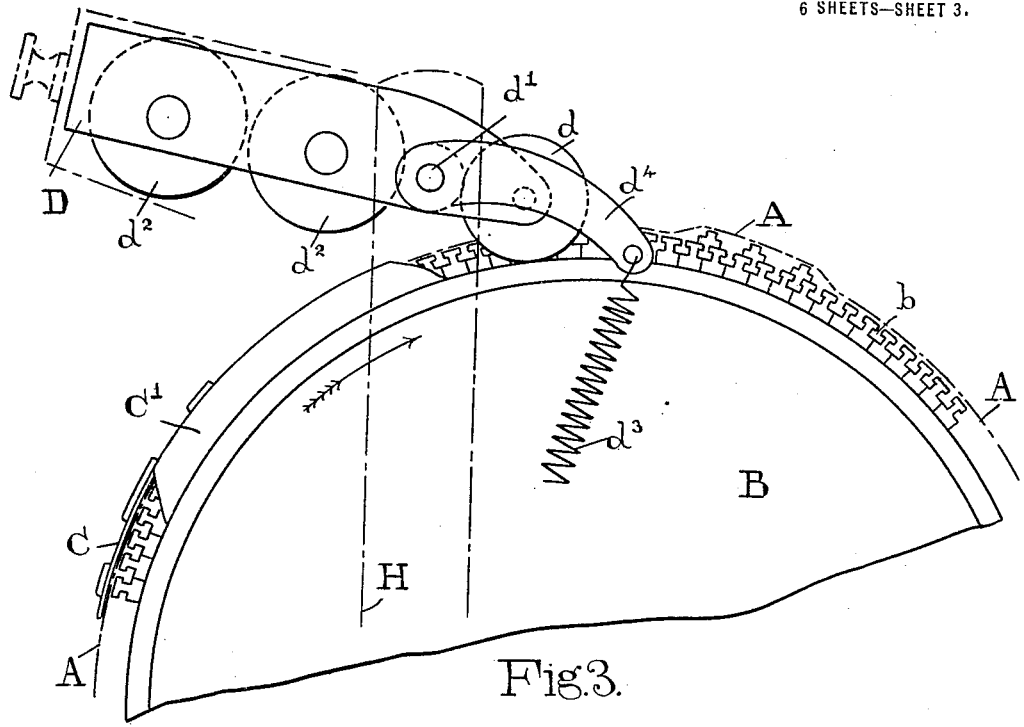
Fig. 3 is a vertical section of the arrangement shown in Fig. 1, with the inking rollers out of engagement with the auxiliary printing plate.
Figure 5:
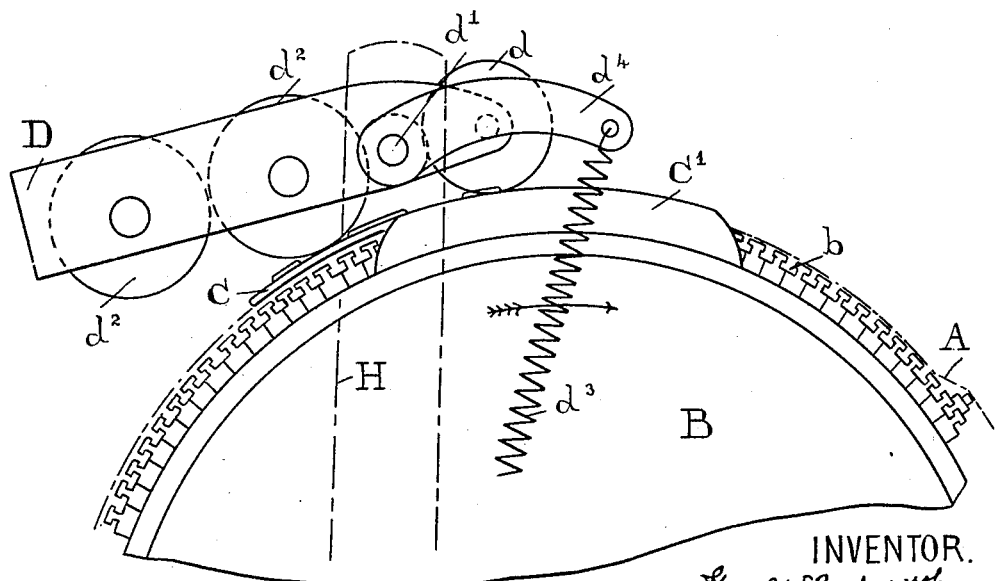
Fig. 5 is a similar view to Fig. 3, with the inking rollers in engagement with the auxiliary printing plate.

The additional printing plate C may project almost to the edge of the ribbon A as shown in Fig. 1, or over the edge of the ribbon as shown in Fig. 2.

Instead of an electro-type, loose type can be employed, fitted into a plate affixed to the cylinder, segmental drum or flexible form, and provided with a cam or inclined surface to be engaged by the runner actuating the inking mechanism. The cam surface for actuating the runner of the inking device may be separated from the additional printing plate instead of being formed therewith or affixed thereto and if desired the inking rollers may be geared together and also positively driven from the rotating cylinder or other rotating part of the machine.

The electro-type plate C (or the plate carrying the loose type) is fitted over the inking ribbon A, which is free to slide between the plate and the type carried on the cylinder, segmental drum or flexible form.

The electro-type plate A or the plate carrying the loose type can be arranged in any position on the cylinder, segmental drum or flexible form without adjustment or alteration of the position of the inking mechanism, as the latter is actuated by the cam surface carried by or moved with the plate itself.

Figure 10:
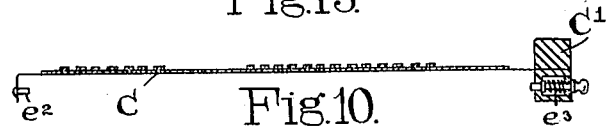
Fig. 10 is a section through same.
Figure 9:
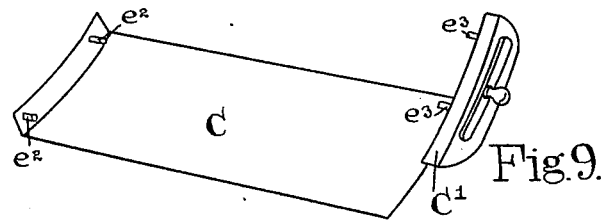
Fig. 9 is a perspective view of same from underneath.
Figure 8:
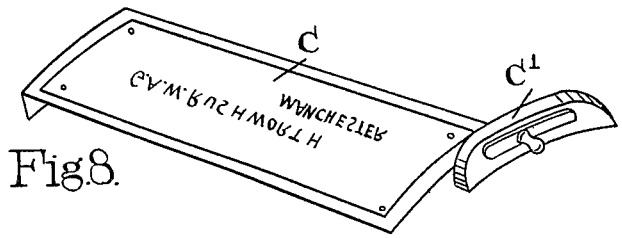
Fig. 8 is a perspective view of the auxiliary printing plate.
Figure 11:
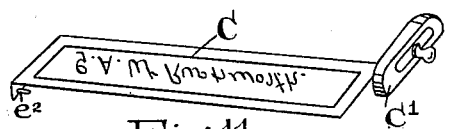
Fig. 11 is a perspective view of auxiliary printing plate employed for printing facsimile signatures.

Figs. 7 to 11 show the invention applied to a rotary duplicating machine in which the printing is effected by wax stencil E carried on the segment of a rotating cylinder B. The additional printing plate C (which may be an electro-type plate as shown in Figs. 8 to 10, a plate having rubber type affixed thereto as in Fig. 13, or a plate carrying loose type in slots) is, as before described with reference to Figs. 1 to 6, provided with a cam surface C' to engage a runner $d$ controlling an inking device D.

The inking device D is pivotally mounted on supports E affixed to the frame of the machine so that the engagement of the cam surface C' with the runner $d$ causes the inking device to be depressed and the rollers $d^2$ thereof to engage the printing surface of the additional printing plate C to apply the ink to the printing surface of the latter.

A spring $d^2$ affixed to a projection $d^5$ on the inking device D and to the frame of the machine returns the inking device to its normal position when the cam surface has moved out of engagement with the runner $d$.

The printing plate C is provided with pins $e^2$ which engage in holes in the side of the cylinder B and if desired, with a spring $e^3$ (see Figs. 8 to 10) to hold it firmly in position but at the same time allowing its position to be readily altered.

The cam surface for actuating the runner of the inking device may be separated from the additional printing plate instead of being formed therewith or affixed thereto, and if desired the inking rollers may be geared together and also positively driven from the rotating cylinder or other rotating part of the machine. Instead of the inking device having two rubber rollers as shown in the drawings, a single roller, felt covered or otherwise, may be employed.

Figure 12:
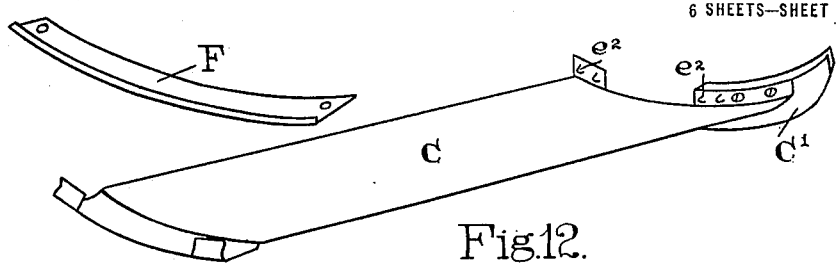
Fig. 12 is a perspective view of a modified construction of auxiliary printing plate.
Figure 13:
Fig. 13 is a longitudinal section of same.

The additional printing plate shown in Figs. 12 and 13 is formed of metal with rubber type affixed thereto, and is fitted on to the cylinder over a packing strip F.

The additional plate can be arranged in any position on the cylinder in relation to the stencil E without adjustment or alteration of the position of the inking mechanism as the latter is actuated by the position of the cam surface which is moved with the printing plate.

In the case of a duplicating machine with a wax stencil the rubber or other type may stand out sufficiently from the stencil to be inked by the inking roller or rollers without the necessity of a cam for bringing the latter into contact with the printing surface.

By this invention it is possible to print headings on letter paper or the like at the same time as, and in a different colour to, the body of the duplicated letter. It is also possible to print a signature or one or more lines in the body of the letter in a different ink and or type from the rest of the letter.

What I claim as my invention and desire to protect by Letters Patent is:—

1. In a rotary duplicating machine the combination with the main duplicating cylinder of a separately inked auxiliary printing device, means for holding said device in any position on the main cylinder so that the auxiliary matter printed can occupy any position desired in relation to the body of the matter printed, a separate inking mechanism for the auxiliary printing device and a cam surface movable with said auxiliary printing device to trip the separate inking mechanism.

2. In a rotary duplicating machine the combination with the main duplicating cylinder of an auxiliary printing plate, projections on the said plate to engage apertures on the main cylinder to hold the plate in any position thereon, a cam affixed to the plate and a separate inking mechanism adapted to be operated by said cam.

3. In a rotary duplicating machine the combination with the main duplicating cylinder of an auxiliary printing plate, projections on the underside of said plate to engage between the types of the main cylinder to hold the plate in any position thereon, a cam affixed to the plate and a separate inking mechanism adapted to be operated by same cam.

In testimony whereof I have hereunto set my hand in presence of two subscribing witnesses.

GEORGE ARTHUR WILLIAM RUSHWORTH.

Witnesses:
J. OWDEN O'BRIEN,
GEORGE H. O'BRIEN.